United States Patent
Defendini et al.

(10) Patent No.: US 7,661,627 B2
(45) Date of Patent: Feb. 16, 2010

(54) METHOD OF CONTROLLING THE ATTITUDE OF SATELLITES, PARTICULARLY AGILE SATELLITES WITH A REDUCED NUMBER OF GYRODYNES

(75) Inventors: Ange Defendini, Montjoire (FR); Mehdi Ghezal, Toulouse (FR)

(73) Assignee: EADS Astrum SAS, Toulouse Cedex (FR)

( * ) Notice: Subject to any disclaimer, the term of this patent is extended or adjusted under 35 U.S.C. 154(b) by 77 days.

(21) Appl. No.: 10/595,621

(22) PCT Filed: Oct. 29, 2004

(86) PCT No.: PCT/FR2004/002800

§ 371 (c)(1),
(2), (4) Date: Jun. 14, 2006

(87) PCT Pub. No.: WO2005/045366

PCT Pub. Date: May 19, 2005

(65) Prior Publication Data

US 2008/0035797 A1    Feb. 14, 2008

(30) Foreign Application Priority Data

Nov. 4, 2003    (FR) .................................. 03 12914

(51) Int. Cl.
*B64G 1/28* (2006.01)
(52) U.S. Cl. .......................................... 244/165; 701/13
(58) Field of Classification Search ................. 244/165, 244/169; 701/13
See application file for complete search history.

(56) References Cited

U.S. PATENT DOCUMENTS 5,681,012 A    10/1997    Rosmann (Continued)

FOREIGN PATENT DOCUMENTS

FR              2 786 283           11/1998

OTHER PUBLICATIONS

Three Dimensional Reorientation of a Spacecraft Containing a Single Reaction Wheel and a Single Movable Appendage. Chunlei Rui, N. Harris McClamroch, Anthony M Bloch. Proceedings of the 36th Conference on Decision and Control. Dec. 1997.*
French Preliminary Search Report FR 0312914; report dated Jun. 11, 2004.

(Continued)

*Primary Examiner*—Michael R Mansen
*Assistant Examiner*—Michael Kreiner
(74) *Attorney, Agent, or Firm*—Miller, Matthias & Hull (57) ABSTRACT

A method of controlling the attitude of a satellite (1) including two gyrodynes (3,4) and a third main actuator (2) which delivers torques at least along the Z axis. The method includes: fixing the gimbal axes, A1 and A2, of the gyrodynes (3, 4) parallel to Z; setting a non-zero bias ($\alpha$) between the angular momentum vectors (Formula I) of the gyrodynes; using the measurements provided by the sensors on board the satellite to estimate the kinematic and dynamic variables necessary in order to control the attitude of the satellite (1); calculating set variables in order to the objectives assigned to the satellite (1) attitude control system; and using the deviations between the estimated variables and the set variables to calculate control orders and to send same to the main actuators (2, 3, 4).

9 Claims, 5 Drawing Sheets

U.S. PATENT DOCUMENTS 6,241,194 B1 * 6/2001 Heiberg ................ 244/165
6,305,647 B1 * 10/2001 Defendini et al. ........ 244/165
6,360,996 B1 * 3/2002 Bockman et al. ......... 244/165

OTHER PUBLICATIONS

International Search Report PCT/FR2004/002800; report dated Mar. 16, 2005.

* cited by examiner

METHOD OF CONTROLLING THE ATTITUDE OF SATELLITES, PARTICULARLY AGILE SATELLITES WITH A REDUCED NUMBER OF GYRODYNES

CROSS-REFERENCE TO RELATED APPLICATIONS

This application claims priority to PCTFR04/02800, filed Oct. 29, 2004, which claims priority to French Patent Application No. 03 12914, filed on Nov. 4, 2003.

A satellite attitude control by exchange of angular momenta delivered by a plurality of inertial actuators having rotary members mounted on the satellite platform is disclosed. More particularly a method and a system for controlling the attitude of what are called agile satellites is disclosed, which are equipped with an attitude control system comprising at least two gyrodynes.

BACKGROUND

It is known that a gyrodyne, also called a gyroscopic actuator and often denoted by the acronym CMG (Control Moment Gyro), is distinguished from reaction wheels, commonly used for controlling the attitude of a satellite by exchange of angular momenta, in that the control moment gyro includes a rotor driven (by a motor) so as to rotate about a rotation shaft which is itself fastened to a support, called a gimbal, which is steerable (by at least one other motor) about at least one gimbal shaft fixed relative to the platform of the satellite, the axis of rotation of the rotor moving perpendicular to the gimbal shaft, whereas a reaction wheel is driven (by a motor) so as to rotate at a variable speed about an axis of rotation that is fixed relative to the platform of the satellite.

Agile satellite attitude control methods and systems of the prior art generally comprise a cluster of three or four control moment gyros delivering large torques along the three axes of the satellite.

One also well-known method consists in using two head-to-tail control moment gyros (their angular momenta being equal in modulus and opposed in direction) for producing torques in a direction, in this case the bisector of said angular momenta.

Moreover, patents U.S. Pat. No. 5,681,012 and U.S. Pat. No. 6,360,996 describe a method using two control moment gyros to produce torques along two different axes.

Figure 1:
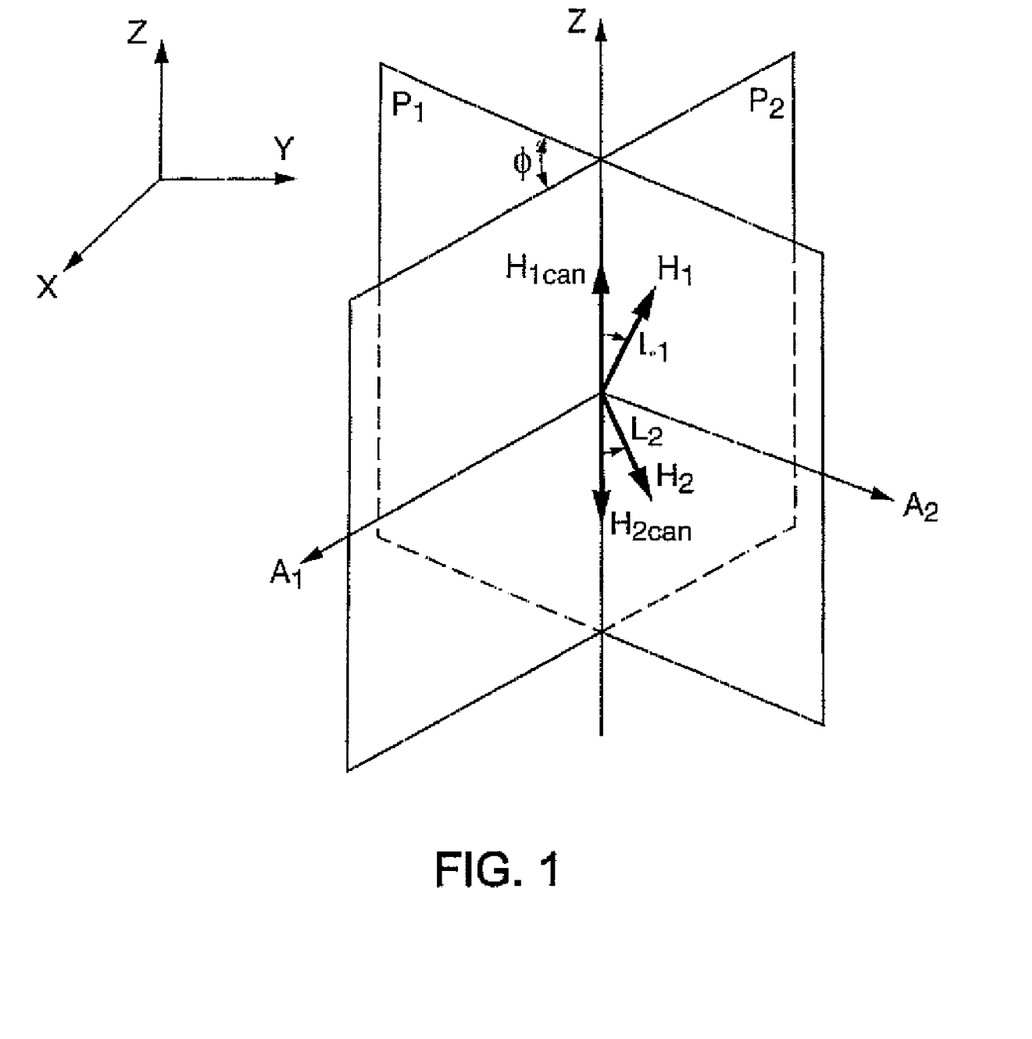
FIG. 1, described above, is a schematic representation of the arrangement of two control moment gyros, represented by the orientations of the gimbal axes and of the angular momentum vectors of the control moment gyros of an attitude control system according to the prior art.

For this purpose, and with reference to FIG. 1, which shows schematically the arrangement of the two control moment gyros by the orientation of their gimbal axes and angular momentum vectors developed relative to the reference orthogonal coordinate system (X, Y, Z), the gimbal axes A1 and A2 of the two control moment gyros are mounted in the plane defined by the two axes X and Y of the coordinate system, this (X,Y) plane being orthogonal to the Z axis, which is for example the pointing axis of an instrument on board the satellite and which is intended to be tilted. The angle φ between the two gimbal axes A1 and A2 must necessarily be nonzero in order to obtain the desired effect. According to the two aforementioned US patents, the preferred angle φ is 120° C. The angular momenta $\overline{H}_1$ and $\overline{H}_2$ of the two control moment gyros are thus constrained to move in the planes P1 and P2 respectively, these being orthogonal to A1 and A2 respectively, and making between them the same angle φ. In the canonical position, the angular momenta $\overline{H}_{1can}$ and $\overline{H}_{2can}$ of the two control moment gyros are advantageously aligned in a head-to-tail configuration along the Z axis, so that the total angular momentum of the pair of control moment gyros is zero. This arrangement is called a "skewed scissor pair"

Starting from this canonical configuration, the angular momenta $\overline{H}_1$ and $\overline{H}_2$ of the control moment gyros are each pivoted about their respective gimbal axis A1 or A2 in such a way that the resultant torque has nominally a zero component along the Z axis, without which at least a third actuator, acting along the Z axis, would have to compensate for this component, which could be high owing to the fact that the torques delivered by the control moment gyros are very high.

In order for this component along the Z axis to be zero, it is necessary to constrain the temporal movement of the rotation angles L1 and L2, given to the two control moment gyros respectively, about their respective gimbal axis A1 and A2, from the canonical position.

More precisely, according to U.S. Pat. No. 5,681,012, it is necessary that:

$$\frac{dL1}{dt} \cdot \sin(L1) = \frac{dL2}{dt} \cdot \sin(L2)$$

that is to say, by integrating:

cos(L1)=cos(L2)+constant, the constant being zero since L1=L2=0 at time t=0.

Consequently, in order for the control method according to U.S. Pat. No. 5,681,012 to be able to be implemented, it is essential that the rotation angles of the control moment gyros, from their canonical position, be equal in absolute value, it being possible for the angles to have the same sign (L1=L2) or opposite signs (L1=L2). The skewing of the two gimbal axes A1 and A2 with a nonzero angle φ then ensures generation of torques in two different directions U1 and U2 in the (X,Y) plane, depending on whether the signs of said rotation angles are the same or are opposed, as described in detail in U.S. Pat. No. 5,681,012, to which the reader may advantageously refer for further details about this subject.

However, it is important to note that, in principle, the generation of these two torques can be accomplished, according to this known method, only sequentially and not simultaneously, as it is not possible to have L1=L2 and L1=L2 at the same time.

The first consequence of this known system and known method is the noncontrollability along the three axes of the system for small angles. Other actuators must be used to overcome this drawback. In addition, to tilt the Z axis about any axis U in the (X,Y) plane, it is necessary to decompose the rotation R(U) about the U axis into a product of two rotations, the first of which takes place about the U1 axis (R(U1)) and the second about the U2 axis (R(U2)).

Thus, to generate the rotation R(U), the satellite will firstly be tilted along U1 in order to perform the rotation R(U1), then along U2 in order to perform the rotation R(U2), with a stop phase between the two rotations.

The limitations of this method are therefore noncontrollability at small angles and also considerable suboptimization in the performance of maneuvers at large angles.

Patent U.S. Pat. No. 6,360,996 relates to improvements made to the method according to U.S. Pat. No. 5,681,012. The basic principle, namely the skewed scissor pair configuration, is maintained. However, in addition, deviations with respect to the constraints:

$$\frac{dL1}{dt} \cdot \sin(L1) = \frac{dL2}{dt} \cdot \sin(L2)$$

that is to say L1=L2 or L1-L2, are accepted in U.S. Pat. No. 6,360,996, the disturbing torques induced along the Z axis then being compensated for by a variation in the speed of the control moment gyro rotors. Thus, complex couplings appear between the control along the (X,Y) axes and the control along the Z axis, in particular in maneuvering mode.

These couplings are not easily manageable and they induce the risk of saturation of the actuators along the Z axis. Management of this saturation is a central feature of the method, as results from the description given in U.S. Pat. No. 6,360, 996, the more so as the control method described in that patent uses only very conventional tilt guidance concepts, by determination of trajectories and generation of torques to be applied to the satellite in order to perform the determined trajectories.

To alleviate the aforementioned drawbacks of the prior art (use of two control moment gyros to create torques along an axis, or along two axes, but with strong implementation constraints), a satellite attitude control system is disclosed that comprises a pair of control moment gyros and at least a third actuator in a configuration different from those known from the prior art, in particular the patents U.S. Pat. No. 5,681,012 and U.S. Pat. No. 6,360,996, so as to achieve attitude control along three axes of the satellite, and also rapid tilts, with guidance and control laws that are very simple to implement, and with controlled inter-axis couplings.

For this purposes the method according to the invention, for controlling the attitude of a satellite equipped with an attitude control system in a reference coordinate system (X, Y, Z) for positioning the satellite, and comprising at least three actuators called main actuators, two of which are control moment gyros each having a rotor driven so as to rotate about a fixed rotation axis with respect to a steerable gimbal that can be oriented about a gimbal axis perpendicular to the rotation axis of the corresponding rotor, and stationary with respect to the satellite, is characterized in that:

the gimbal axes of the two control moment gyros are fixed so that these gimbal axes are parallel to each other and to the Z axis, the angular momentum vectors ($\overline{H}_1, \overline{H}_2$) of the control moment gyros therefore moving in the (X,Y) plane and making between them an angle ($\alpha$) which, by definition, corresponds to a skew $\epsilon=180-\alpha$ between the angular momentum vectors ($\overline{H}_1, \overline{H}_2$) when $\alpha$ is different from 0° and 180°;

in addition to the two control moment gyros, at least a third main actuator is used as a complement, delivering torques in both senses in at least one direction not lying in the (X,Y) plane, so that this third main actuator is called the Z-axis main actuator;

a nonzero skew angle ($\epsilon$) between the angular momentum vectors ($\overline{H}_{11}, \overline{H}_2$) of the control moment gyros is imparted, said skew angle ($\epsilon$) preferably being chosen to be small enough not to create an excessively large internal angular momentum on board the satellite but large enough to ensure controllability of the attitude control system along the three axes (X, Y, Z) without necessarily having to modify the rotation speed of the rotor of at least one of the control moment gyros;

the kinematic and dynamic variables, which are necessary for controlling the attitude of the satellite, such as for example the attitude angles and angular velocities of the satellite along the three axes, are estimated from measurements provided by sensors used on board the satellite;

setpoint variables, intended to allow objectives assigned to the satellite attitude control system to be achieved, such as for example the tilting and pointing along at least one of the three axes of the (X, Y, Z) coordinate system, are calculated; and control commands are calculated, from differences between said estimated variables and said setpoint variables, and then sent to the main actuators, these control commands being intended to control the change in said differences over time, said control commands transmitted to the control moment gyros comprising at least commands intended to vary the orientation of their gimbal axes, such as for example gimbal angular position setpoints that have to be generated by a local position feedback control, or electric current setpoints, for currents that have to be injected into motors for orienting the gimbal axes, etc.

This method using one pair of control moment gyros in this particular configuration, in which the angular momenta change in the (X,Y) plane with a nonzero angle $\alpha$, about a position not aligned head-to-tail but with a nonzero skew angle $\epsilon=180-\alpha$, and also at least one third actuator for creating nonzero torques about the Z axis normal to the (X,Y) plane, is advantageous over the prior art in that it makes it possible, as described below, on the one hand, to very simply control the attitude of the satellite along the three axes (X, Y, Z) without it being necessary to modify the rotation speed of the control moment gyro rotors and, on the other hand, to easily perform rapid tilting maneuvers of the Z axis, by advantageously applying the guidance techniques in maneuvering mode that are proposed in the Applicant's patent FER 2 786 283, all this with great ease of design of the control system, in particular with regard to management of the coupling between the (X, Y, Z) axes and the design of the actuators that result therefrom.

BRIEF DESCRIPTION OF THE DRAWINGS

Other advantages and features of the disclosed embodiments will become apparent from the description given below, by way of a nonlimiting example, with reference to the appended drawings in which.

DETAILED DESCRIPTION OF THE PRESENTLY PREFERRED EMBODIMENTS

Figure 2A:
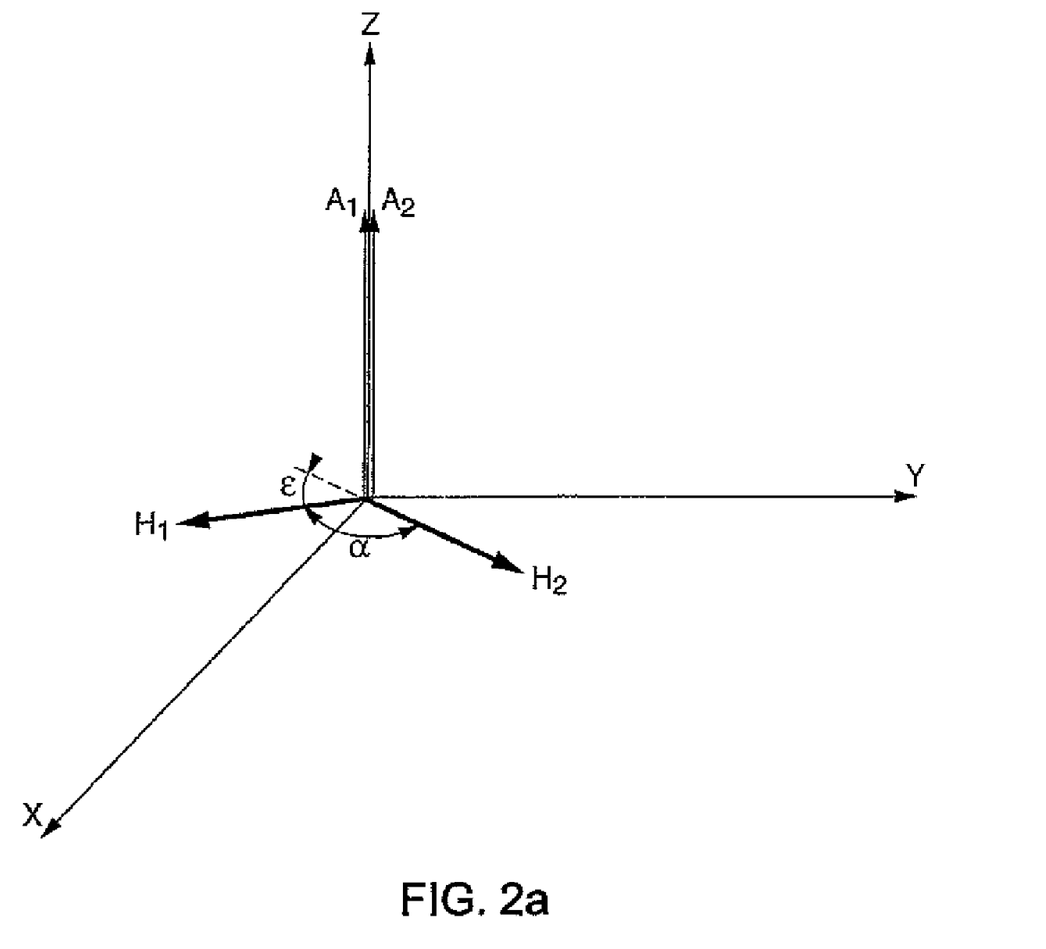
FIGS. 2a and 2b show, in a manner similar to FIG. 1, the orientations of the gimbal axes and the angular momentum vectors of the two control moment gyros of the attitude control system according to the invention, respectively in a principle configuration, in which a third main actuator is advantageously a Z-axis reaction wheel, and in a redundant configuration in which the third main actuator comprises two reaction wheels, the rotation axes Z1 and Z2 of which are skewed relative to the Z axis.
Figure 3:
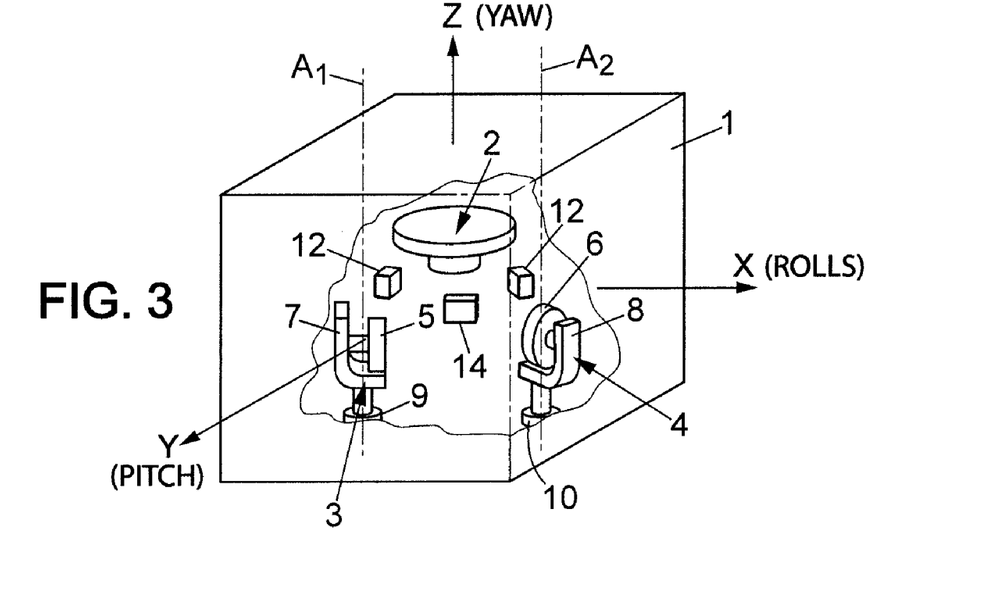
FIG. 3 is a schematic representation of the three main actuators, including two control moment gyros and one reaction wheel, of a satellite attitude control system according to the invention.

To implement the disclosed satellite attitude control method, one possible embodiment of the control system is the following. The satellite attitude control system comprises:

- as main actuators, two control moment gyros, the gimbal axes of which are parallel to each other and, typically, to the Z axis, it being possible for their angular momenta $\overline{H}_1$ and $\overline{H}_2$ to be independently oriented in all directions in the (X,Y) plane, as shown in FIG. 2a, and also a third actuator, advantageously at least one reaction wheel, used as a complement for delivering torques, in both senses, out of the plane of the angular momenta of the control moment gyros (for example along the +Z and −Z directions), this other actuator being called in the rest of the description the Z-axis main actuator. FIG. 3 shows schematically such an example of three main actuators. In the embodiment shown in FIG. 3, which is of a type that can be used in particular on a satellite, the platform of which is shown schematically as 1, the Z-axis main actuator is a reaction wheel 2, with a variable rotation speed and controlled about the Z axis, for example the yaw axis of the satellite, whereas the two control moment gyros 3 and 4 each have a rotor, 5 and 6 respectively, which are driven so as to rotate at a controlled speed, which is usually constant but which can be variably controlled, about a rotation axis contained in the plane defined by the roll axis X and the pitch axis Y of the satellite, each rotor 5 and 6 being mounted so as to rotate on a steerable gimbal 7 and 8 respectively, by an electric motor 9 and 10 respectively, about a gimbal axis $A_1$ or $A_2$ respectively, which is parallel to the yaw axis Z. Thus, it will be understood that the angular momenta $\overline{H}_1$ and $\overline{H}_2$ of the control moment gyros 3 and 4 may be independently, and possibly simultaneously, oriented in all directions in the (X,Y) plane by rotation of the gimbals 7 and/or 8 about their respective gimbal axis $A_1$ or $A_2$, whereas the reaction wheel 2 delivers, complementarily, torques along the +Z and −Z directions lying outside the plane of the angular momenta $\overline{H}_1$ and $H_2$ of the control moment gyros 3 and 4;
- as secondary actuators, the system also includes a set of actuators such as, for example, magnetic-torquers, jet actuators, steerable reflecting ailerons or tabs, or any other actuators necessarily used on board satellites for counteracting the cumulative effects of external disturbing torques always present in orbit;
- as sensors, the system also includes a set of external or internal attitude sensors 12 for reconstructing the attitude angles and angular velocities of the satellite with respect to a three-axis (geocentric or inertial or other) reference frame and thus for measuring the differences between these reconstructed attitudes and velocities and the desired attitude and velocity of the satellite along the three axes, and also sensors needed for control mechanisms of the main and secondary actuators (measurements of the speed of the wheel 2, measurements of the positions and rotation speeds of the gimbals 7 and 8 about the gimbal axes of the control moment gyros 3 and 4, etc.); and
- as computational means, the system further includes any type of computational member (microprocessor, computer, DSP, ASIC, FPGA, microcontroller, electronic circuit, etc.) for producing, in digital or analog form, or digital/analog hybrid form, signals representative of at least the following quantities: setpoint variables, such as the attitude angles (or quaternion) of the satellite, the angular velocity of the satellite, the inertial orientation of an axis fixed in the satellite reference frame, setpoints needed to perform satellite orientation maneuvers (setpoint trajectory in terms of attitude, speed, angular acceleration, temporal profiles of the torques or angular momenta needed to carry out the maneuver, etc.), estimation of the attitude and angular velocity of the satellite with respect to the three axes on the basis of the measurements of the sensors, commands to be sent to the main and secondary actuators, etc.

In the initialization phase of the system, advantageously starting from a configuration in which the angular momenta of the two control moment gyros are equal and opposite ($\alpha=180°$), the secondary actuators, and optionally the third, Z-axis main actuator 2 when it is skewed and can generate a angular momentum component in the (X,Y) plane, are operated, in parallel or sequentially, in order to generate an angular momentum in at least one direction in the (X,Y) plane for bringing, by negative feedback, simultaneously or sequentially, the pair of control moment gyros 3 and 4 into a configuration in which the angle $\alpha$ has $\alpha$ value sufficiently far from 180° without however being zero, the total angular momentum of the pair of control moment gyros thus being nonzero and opposed to the angular momentum generated by the secondary actuators.

The angular momentum skew ($\overline{H}_1+\overline{H}_2=\overline{H}$) of the pair of control moment gyros created by $\alpha$ different from 180° may be positioned advantageously (but not necessarily) along the normal to the orbital plane of the satellite, so as to limit the angular momentum transfer between the control moment gyros during the operational phase and during the tilting of the satellite.

For the same reason, the angular momentum skew ($\overline{H}$) of the pair of control moment gyros created by a different from 180° may advantageously be compensated for by the projection in the (X,Y) plane of the cumulative angular momentum for this purpose by the third main actuator (FIG. 2b), so that the cumulative total angular momentum produced by the actuators is zero.

Figure 2B:
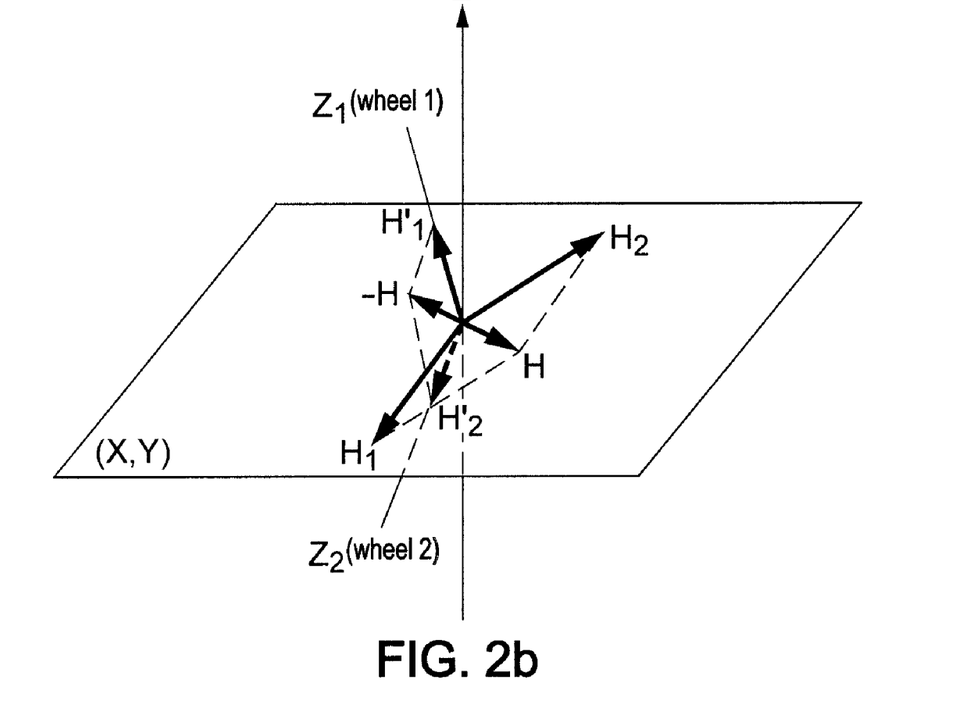

To give an illustration, one particular redundant configuration based on two control moment gyros and a third main actuator consisting of two reaction wheels, implementing this method is shown in FIG. 2b, in which Z1 and Z2 denote the rotation axes of the two reaction wheels, which axes are skewed relative to Z, and $\overline{H}'_1,\overline{H}'_2$ are the angular momentum vectors, produced by the two reaction wheels by controlling their rotation speed in such a way as to compensate for the total angular momentum H of the pair of control moment gyros. Thus, if $\overline{H}_1+\overline{H}'_2=H$ then $\overline{H}'_1+\overline{H}'_2=\overline{H}$.

Once positioned in this configuration in which $\alpha$ is nonzero and different from 180°, the pair of control moment gyros 3 and 4 may be used very simply to ensure controllability of the satellite along the X and Y axes, without having to vary the speed of any of the two rotors 5 and 6.

Figure 4A:
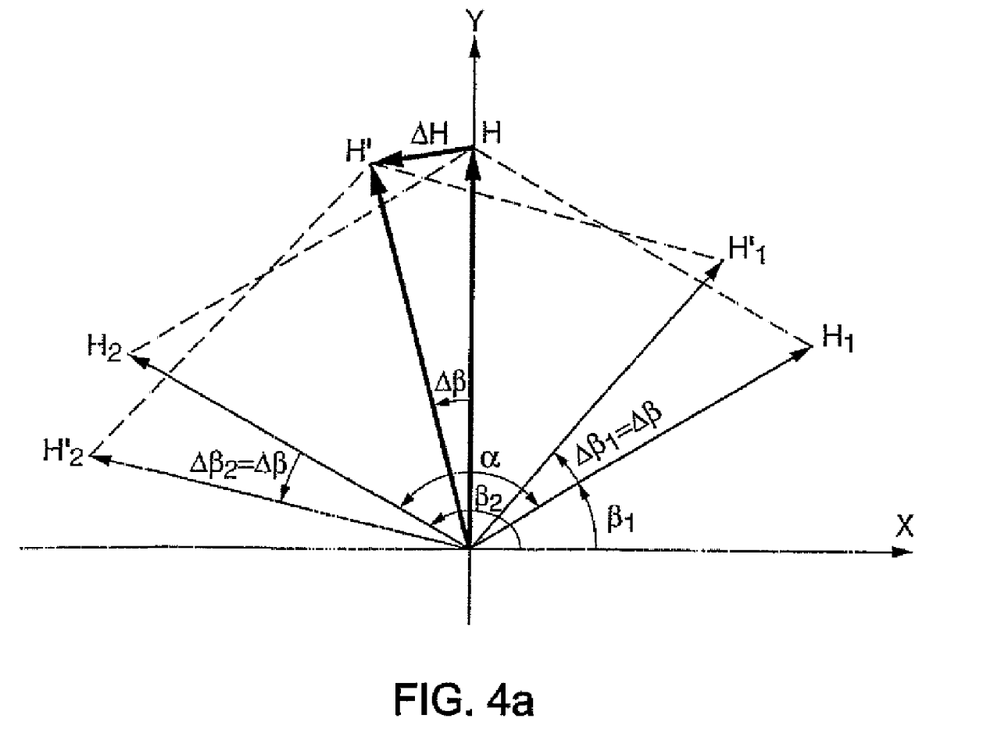
FIGS. 4a and 4b are schematic representations, in the (X,Y) plane in which the angular momentum vectors of the two control moment gyros of the attitude control system according to the invention change, of the effect, on the total angular momentum vector H, respectively of a variation by one and the same small angle of the orientation angles of the angular momentum vectors of the two control moment gyros and of variations in small opposed angles of the same two angular momentum vectors.

This is because, as shown in FIG. 4a, if $\beta_1$ is the angle between $\overline{H}_1$ and the X axis and $\beta_2$ is the angle between $\overline{H}_2$ and the X axis, by varying $\beta_1$ and $\beta_2$ by the same small angle $\Delta\beta=\Delta\beta_1=\Delta\beta_2$ over the time $\Delta T$, a therefore remaining constant, the effect obtained is to rotate the total angular momentum $\overline{H}=\overline{H}_1+\overline{H}_2$ of the two control moment gyros 3 and 4 about the Z axis, thus creating a torque $\Delta H/\Delta T$ normal to $\overline{H}$ (at small angles).

Figure 4B:
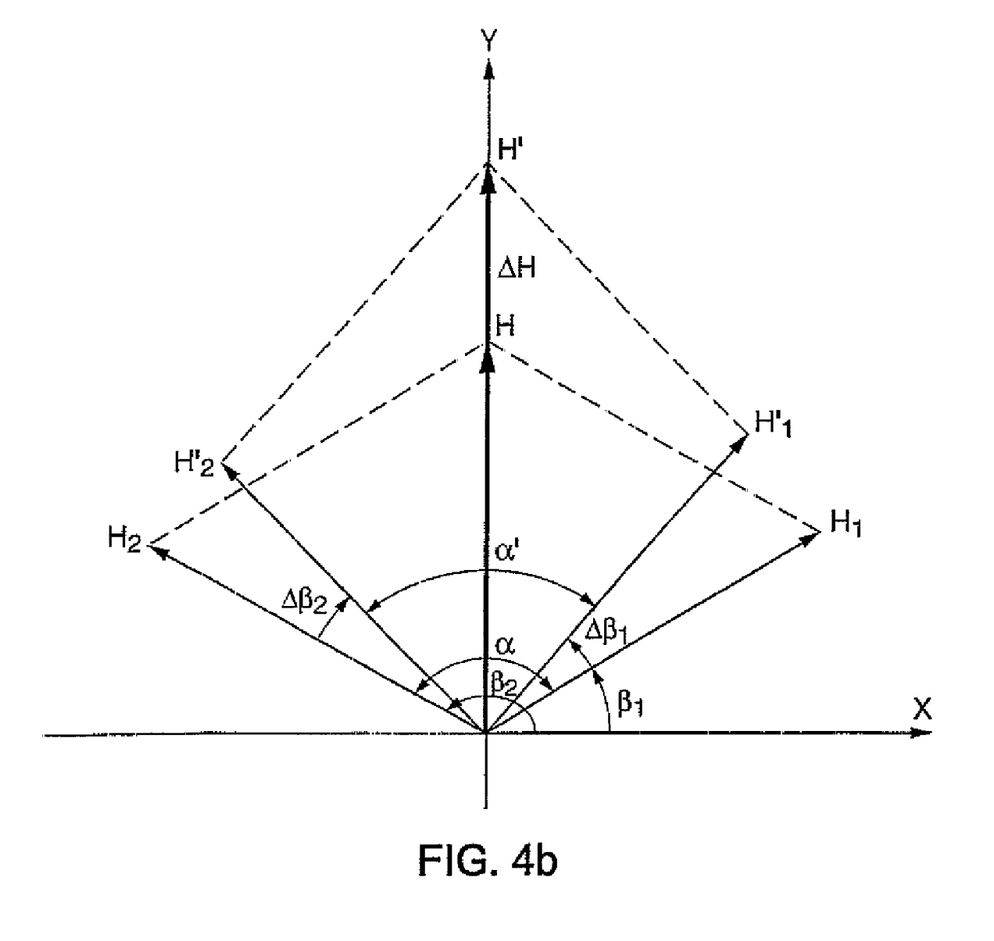

Moreover, by varying α (from α to α'), while keeping orientation of the bisector of the angle of the angular momenta $\overline{H}_1$ and $\overline{H}_2$ constant (which moments become $\overline{H}'_1$ and $\overline{H}'_2$ for α'), in other words by rotating the control moment gyros 3 and 4 in such a way that $\Delta\beta_1 = \Delta\beta_2$, as shown in FIG. 4b, the total angular momentum $\overline{H} = \overline{H}_1 + \overline{H}_2$ which becomes $\overline{H}' = \overline{H}'_1 + \overline{H}'_2$, varies in norm (from ΔH) but not in direction, thus creating a torque in the direction of H or of —H.

In total, by independently varying both β1 and β2 by a suitable amount $\Delta\beta_1$ and $\Delta\beta_2$, any torque can be very rapidly created along any direction in the (X,Y) plane, thereby ensuring complete (X,Y) controllability, and also its quasi-decoupling with control about the Z axis at small angles and/or low angular velocities, provided by the Z-axis main actuator.

In this way, the satellite attitude control system uses the main actuators (the pair of control moment gyros 3 and 4 and the third main actuator 2) as nominal control means.

In fine (small-angle) pointing mode, on the basis of observed differences between setpoint variables (attitude, angular velocity, pointing of a reference axis, etc) and estimated variables, the computational member generates commands to be sent to these actuators in order to generate the torques needed to correct fox these differences. The commands sent may be of various types, digital or analog, and pertain to various physical variables, such as for example the current to be injected into the motors such as 9 and 10 for the gimbal shafts and for the wheel or wheels such as 2 and the rotors 5 and 6, the absolute or relative position of the gimbals such as 7 and 8 in rotation about the gimbal axes, the gimbal rotation speed, the rotation speed of the wheel or wheels 2 and the rotors 5 and 6, etc. Their effect at small angles is always to create small torques about the X, Y, Z axes, allowing the satellite to be stabilized around the setpoint variables.

Advantageously, the variation in the angles $\beta_1$ and $\beta_2$ is calculated and applied so as to accomplish, alone and in totality, the desired servocontrol along the X and Y axes, and to do so using the abovementioned principle elements, which a person skilled in the art can easily use to define the precise algorithms to be implemented. The Z-axis main actuator (for example the reaction wheel 2 of FIG. 3) is used to accomplish, alone and in totality, the Z-axis servocontrol, and to do so in a manifestly independent manner at small angles.

The method of the invention makes it possible to install a system momentum offloading strategy. This is because, owing to the effect of the external disturbing torques, which act continually and cumulatively, the total angular momentum of the system of main actuators (control moment gyros 3 and 4 and wheel 2) does not cease to increase: the angular momentum of the Z-axis third actuator (in the case of at least one reaction wheel 2) will have a tendency to increase up to saturation, and the pair of gyroscopic actuators 3 and 4 will have a tendency to be aligned in the α=0° position, possibly passing via the undesirable α=180° configuration. In this case, the system becomes uncontrollable. It is therefore necessary to limit the excursions of the speed of the wheel 2 and the range of variations of the angle α within acceptable limits (the specified angular range including neither 0° nor 180° in the case of α) that depend on the precise design of the system. To achieve this offloading effectively, secondary actuators are used, either in open loop, for example by estimating the orbital disturbing torques and compensating for them, or in closed loop, or by combining these two solutions. To give an example, the control system sends commands to these secondary actuators, which have the effect of creating a variation in the angular momentum in the same sense as its observed increase, while still maintaining, of course, the attitude setpoints at their nominal value. In reaction to these effects, the system of main actuators 2, 3 and 4 can but produce its own accumulated angular momentum, thereby moving the actuators (control moment gyros 3 and 4 and third actuator 2) away from their saturation zone.

Starting from an initial configuration of the control moment gyros 3 and 4, in which α may be close to 180°, the large-angle maneuvers are advantageously carried out by implementing a method similar to that described in FR 2 786 283, to which the reader may refer for any details on this subject, which document is incorporated in the present specification by way of reference.

To carry out rapid tilting maneuvers, the method advantageously includes the following steps in which:

a setpoint configuration for the pair of control moment gyros, away from the singular configurations, that is to say from the configurations for which the angle α is zero or equal to 180°, and possibly a temporal Z-axis angular momentum profile that has to be performed by the third, Z-axis main actuator are determined from the initial and final conditions of the satellite in terms of attitude angles, angular velocity and time, in such a way that the angular momentum exchange, over an imposed duration, between the satellite, the two control moment gyros brought into said setpoint configuration and the Z-axis third actuator, brings about the desired attitude maneuver; and the orientation of the gimbal of each of the control moment gyros is brought, simultaneously and possibly independently, into its orientation in the setpoint configuration thanks to an angular position setpoint sent, in open loop, into a local servomechanism 14 for controlling the angular position of the gimbals; and the Z-axis angular momentum profile is generated, simultaneously and possibly independently, using the third, Z-axis main actuator, advantageously at least one reaction wheel, the rotation speed of which will consequently be varied.

In this method, the reorientation of the control moment gyros in their setpoint configuration will advantageously be accomplished very rapidly, and may consequently pass transiently through singular positions (α=0° or 180°) without it being prejudicial to the proper behavior of attitude control.

Since the setpoint configuration of the control moment gyros is chosen to be a nonsingular position, the system remains controllable in this configuration, so that, advantageously, on the basis of differences observed in the generation of the maneuver profile relative to a predefined setpoint profile, closed-loop commands are added to the open-loop setpoints sent to the main actuators so as to reduce said differences.

The setpoint configuration away from the singularities will be chosen according to the controllability reserves that the designer will wish to have in order to perform the closed-loop control during the maneuver. For a given tilting maneuver, it will always be possible to increase this distance from the singularities by for example limiting the maximum tilt speed.

In this maneuvering mode, the homing of the pair of control moment gyros onto its setpoint configuration advantageously takes place as rapidly as possible (the sole limitations being the capacity of the motors for the gimbal shafts of the control moment gyros and the rigidity of said control moment gyros), so as to optimize the duration and implementation of the maneuver.

In this method, the rapid reorientation of the pair of control moment gyros into its setpoint configuration ensures essentially tilting of the satellite. The Z-axis actuator is used simply to manage, during the maneuver, the transfer of the initial angular momentum (at $t=t_0$) $\overline{H}^0 = \overline{H}_1^0 + \overline{H}_2^0$ of the pair of control moment gyros (due to the skew between the said control moment gyros) from the (X,Y) plane to the Z axis, completely or partly according to the maneuver, so that this angular momentum $\overline{H}^0$ remains inertial. Since the maneuver is known, it is easy to reduce the temporal profile of the angular momentum transfer to be produced with the Z-axis main actuator so that the coupling between the (X,Y) and Z axes is very easy to manage according to our method.

The disclosed three-axis attitude control system and method thus make it possible, by minimizing the number of main actuators of the control moment gyro type, and therefore allowing substantial savings in terms of weight, power, volume and cost, to control satellites for which agility essentially about two axes is required.

The invention claimed is:

1. A method for controlling the attitude of a satellite equipped with an attitude control system in a reference coordinate system (X, Y, Z) fixed with respect to the satellite for positioning the satellite, the method comprising:
providing the attitude control system that comprises:
only three primary actuators including two control moment gyros and one Z-axis actuator, the two control moment gyros each comprising:
a rotor connected to a steerable gimbal, each rotor having a fixed axis with respect to the steerable gimbal, each gimbal having a fixed axis with respect to the satellite, the fixed axis of each rotor being perpendicular with respect to the fixed axis of its connected gimbal, the gimbal axes being parallel to each other and the Z-axis,
each rotor driven to rotate about its fixed axis to orient its connected steerable gimbal about the fixed axis of said gimbal,
the Z-axis actuator delivering torque in at least one direction not lying in a (X, Y) plane,
the angular momentum vectors ($H_1$, $H_2$) of the control moment gyros move in the (X, Y) plane and define between them an angle ($\alpha$) which is related to a skew angle ($\epsilon$), wherein $\epsilon = 180 - \alpha$ between the angular momentum vectors ($H_1$, $H_2$) when $\alpha$ is greater than 0° and less than 180°;
wherein the method further comprises the following steps:
providing a set of secondary actuators used to achieve the offloading of the primary actuators; the secondary actuator being chosen among magnetic torquers, jet actuators, steerable reflecting ailerons or tabs;
the method comprises an initialization phase during which the secondary actuators are operated in order to generate an angular momentum in at least one direction in the (X,Y) plane for bringing the pair of control moment gyros into a configuration in which the angle ($\alpha$) has a value different from 0° and 180°;
the method further comprising the steps of:
using the Z-axis actuator for delivering torques in at least one direction not lying in the (X, Y) plane;
imparting nonzero skew angle ($\epsilon$) between the angular momentum vectors ($H_1$, $H_2$) of the control moment gyros;
estimating kinematic and dynamic variables of the satellite along the X, Y and Z axes from measurements provided by sensors disposed on board the satellite;
calculating setpoint variables for controlling a desired attitude of the satellite with respect to the three axes of the (X, Y, Z) coordinate system; and
calculating control commands from differences between said estimated kinematic and dynamic variables and said setpoint variables, the control commands comprising commands to vary the orientation of the gimbal axes of the control moment gyros;
sending the calculated control commands to the three primary actuators;
sending commands to the secondary actuators to modify the angle ($\alpha$) between the angular momentum vectors (H1 and H2) of the control moment gyros so that said angle ($\alpha$) remains within a specified range that includes neither 180° nor 0°.

2. The control method as claimed in claim 1, wherein the Z-axis actuator comprises one reaction wheel.

3. The control method as claimed in claim 1, wherein a total angular momentum of the two control moment gyros, resulting from the skew ($\epsilon$) angle between the angular momentum vectors ($H_1$, $H_2$) of said control moment gyros, is oriented in a direction normal to the orbital plane of the satellite.

4. The control method as claimed in claim 1, wherein a total angular momentum of the two control moment gyros, resulting from the skew ($\epsilon$) angle between the angular momentum vectors ($H_1$, $H_2$) of the two control moment gyros, is compensated for by the projection in the (X,Y) plane of the cumulative specific moment by the Z-axis actuator.

5. The control method as claimed in claim 1 further comprising:
establishing a setpoint configuration for the two control moment gyros from initial and final conditions of the satellite so that an angular momentum exchange between the satellite and the two control moment gyros is brought into said setpoint configuration and
generating a desired attitude maneuver with the Z-axis actuator, the Z-axis actuator comprising a reaction wheel; and
rotating the rotors using an open-loop servocontrol to orient each gimbal within the setpoint configuration; and
generating a Z-axis angular momentum profile by varying a speed of the reaction wheel.

6. The control method as claimed in claim 5, further comprising:
adding closed-loop commands to the open-loop servocontrol.

7. The control method as claimed in claim 1, further comprising:
using the at least one secondary actuator to generate torques along one or more of the X, Y or Z, axes of the reference coordinate system, and
desaturating the Z-axis actuator.

8. The control method of claim 1, wherein the kinematic and dynamic variables comprise attitude angles and angular velocities of the satellite.

9. The control method as claimed in claim 1, wherein the commands to vary the orientation of the gimbal axes of the control moment gyros comprise gimbal angular position setpoints that have been generated by a local feedback control in position or electric current setpoints, for currents that have been injected into motors for orientating the gimbal axes.

* * * * *

UNITED STATES PATENT AND TRADEMARK OFFICE
CERTIFICATE OF CORRECTION

PATENT NO.         : 7,661,627 B2
APPLICATION NO. : 10/595621
DATED                  : February 16, 2010
INVENTOR(S)        : Ange Defendini et al.

It is certified that error appears in the above-identified patent and that said Letters Patent is hereby corrected as shown below:

On the title page item (73), Assignee should read "EADS ASTRIUM SAS" and not "EADS Astrum SAS."

Signed and Sealed this

Eleventh Day of May, 2010

David J. Kappos
*Director of the United States Patent and Trademark Office*